W. S. SNOOK.
WATER FILTER.

No. 189,806. Patented April 17, 1877.

Witnesses
Geo H Strong
J. L. Boone

Inventor
William S Snook
by Dewey & Co
Attys

UNITED STATES PATENT OFFICE.

WILLIAM S. SNOOK, OF OAKLAND, CALIFORNIA.

IMPROVEMENT IN WATER-FILTERS.

Specification forming part of Letters Patent No. 189,806, dated April 17, 1877; application filed February 16, 1877.

*To all whom it may concern:*

Be it known that I, WILLIAM S. SNOOK, of Oakland, county of Alameda, and State of California, have invented an Improved Water-Filter; and I do hereby declare the following to be a full, clear, and exact description thereof, reference being had to the accompanying drawings.

The object of my invention is to provide a cheap filter for attachment to water-pipes, through which water is conducted under pressure, so that the water can be cleaned and purified for drinking and other purposes.

Figure 1:
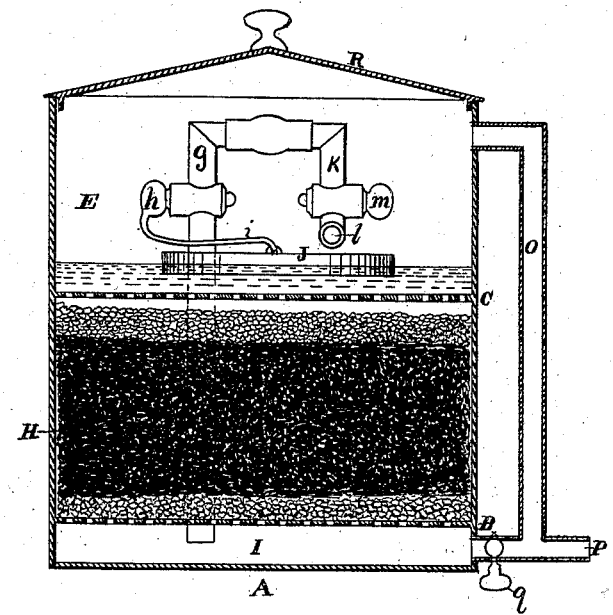
Figure 2:
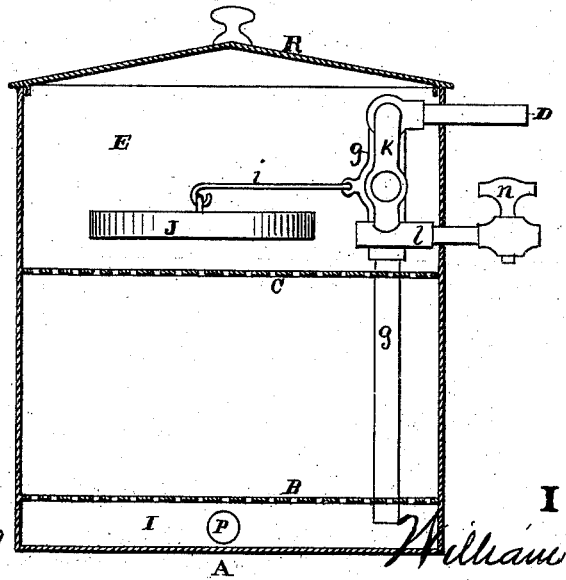

Referring to the accompanying drawings, Figures 1 and 2 are vertical sections of my filter.

A represents a tank or vessel of any suitable size. Inside of this tank, and a short distance above its bottom, I secure a horizontal perforated partition, B, upon which I place, in layers, the usual filtering substances, such as gravel, charcoal, and the like, until a body, H, of filtering material of the desired thickness is obtained, having the chamber I below it. Above this filtering material I then secure another perforated partition, C, so that it can be removed when desired. The tank or vessel A is high enough to provide a chamber, E, of considerable size above this upper partition, for the purpose hereinafter specified. D is the water-pipe through which the water is conducted under pressure into the tank. This pipe passes through the side of the vessel A near its top, and is connected with a T-coupling inside of the chamber E. To one end of this T-coupling the upper end of the vertical pipe $g$ is connected, and this pipe passes down through both of the partitions B C and the body of filtering material, so that its lower end terminates in the chamber below the lower partition B. Near the upper end of this pipe $g$, inside of the chamber E, is a cock, $h$, from which a rod, $i$, extends, and to this rod is attached a float, J. The opposite end of the T-coupling is connected by a vertical pipe, K, with a horizontal pipe, $l$, which passes out through the side of the vessel. In the length of the pipe K is a cock, $m$, and in the pipe $l$ outside of the vessel is another cock, $n$. The inner end of the pipe $l$ terminates in the chamber E, and is open. $o$ is a waste-pipe which leads from the upper part of the chamber E down to nearly the bottom of the vessel, and connects with a horizontal pipe, P, which leads from the chamber below the partition B. In the length of this pipe P is a cock, $q$.

It will be noticed that when the cock $m$ is closed, the water which enters the vessel through the main pipe D will pass down the vertical pipe $g$, and be delivered into the chamber below the partition B in the bottom of the vessel. The pressure in this chamber will force the water upward through the filtering material, and fill the chamber E with filtered water until the float J is raised high enough to close the cock $h$, which shuts off any further supply until a portion of the water in the chamber E is withdrawn, and the float allowed to settle down and open the cock $h$ again.

By this means I am able to employ an open-top tank as a filtering-vessel, as the water cannot rise above a specified height in the chamber E; but in order to keep out dust and dirt I place a tightly-fitting cover, R, upon the open top of the vessel.

When a small filtering-vessel is used and is connected with the hydrant or other pipe for filtering a limited quantity of water for drinking purposes, a common faucet can be attached to the outer end of the pipe $l$, so that the filtered water can be drawn through it, but when the tank is large and intended to supply the entire house with filtered water, the house-supply pipe can be connected with the pipe $l$.

To cleanse the filtering material I permanently shut the cock $h$, draw off the water from the vessel through the pipe P, and then open the cock $m$, so as to admit water into the chamber E; this water will then percolate downward through the filtering material and carry the sediment with it out through the pipe P.

To renew the filtering material I simply remove the cover R, take out the upper perforated partition C, when the old filtering material can be removed, and fresh material inserted.

This filter can be cheaply constructed and easily managed, and will therefore be of great value for household purposes.

Having thus described my invention, what I claim as new, and desire to secure by Letters Patent, is—

The open-top vessel A, provided with the chamber I below the body of filtering material, and a reservoir or chamber, E, above it, and having the water-pipe $g$ arranged to pass vertically down through the chamber E and filtering material, so as to deliver the water below the filtering material, in combination with the cock $h$, rod $i$, and float J, substantially as and for the purpose above specified.

In witness whereof I have hereunto set my hand and seal.

WILLIAM S. SNOOK. [L. S.]

Witnesses:
O. T. STACY,
JNO. L. BOONE.